(12) United States Patent
Lo (10) Patent No.: US 7,613,838 B1
(45) Date of Patent: *Nov. 3, 2009

(54) LOW OVERHEAD CODING WITH ARBITRARY CONTROL CODE PLACEMENT

(75) Inventor: William Lo, Cupertino, CA (US)

(73) Assignee: Marvell International Ltd., Hamilton (BM)

( * ) Notice: Subject to any disclaimer, the term of this patent is extended or adjusted under 35 U.S.C. 154(b) by 0 days.

This patent is subject to a terminal disclaimer.

(21) Appl. No.: 11/888,188

(22) Filed: Jul. 31, 2007

Related U.S. Application Data (63) Continuation of application No. 10/601,235, filed on Jun. 20, 2003, now Pat. No. 7,251,699.

(60) Provisional application No. 60/445,767, filed on Feb. 7, 2003, provisional application No. 60/449,322, filed on Feb. 21, 2003.

(51) Int. Cl.
*G06F 15/16* (2006.01)
(52) U.S. Cl. .................................................. 709/250
(58) Field of Classification Search .................. 709/250
See application file for complete search history.

(56) References Cited

U.S. PATENT DOCUMENTS

| 6,362,757 | B1 | 3/2002 | Lee et al. | |
|---|---|---|---|---|
| 6,476,737 | B1 | 11/2002 | Caroselli et al. | |
| 6,504,493 | B1 | 1/2003 | Burd | |
| 6,813,651 | B1 | 11/2004 | Smith et al. | 710/20 |
| 6,823,483 | B1 * | 11/2004 | Creigh | 714/701 |
| 7,089,485 | B2 * | 8/2006 | Azadet et al. | 714/798 |
| 2001/0034729 | A1 | 10/2001 | Azadet et al. | |
| 2003/0147654 | A1 | 8/2003 | Sung et al. | 398/168 |
| 2003/0187994 | A1 | 10/2003 | Jackson et al. | 709/227 |
| 2005/0111532 | A1 * | 5/2005 | Creigh | 375/219 |

OTHER PUBLICATIONS

IEEE Std. 802.3-2002 (Revision of IEEE Std. 802.3, 2000 Edition), 802.3 IEEE Standard for Information Technology, Telecommunications and Information Exchange Between Systems, Local and Metropolitan Area Networks, Specific Requirements Part 3: Carrier Sense Multiple Access with Collision Detection (CSMA/CD) Access Method and Physical Layer Specifications (pp. 1-104).

* cited by examiner

*Primary Examiner*—Krisna Lim (57) ABSTRACT

A physical layer device of a network device comprises a physical coding sublayer (PCS) device encodes data to produce an encoded data block. A scrambler communicates with the PCS device and scrambles the encoded data block to produce a scrambled data block. A sync adder adds a sync header to the scrambled data block. The sync header has a first state when the scrambled data block only includes data portions. The sync header has a second state when the scrambled data block includes at least one control code portion.

28 Claims, 8 Drawing Sheets

| Input Data | S Y N C | Block Payload | | | | | | | |
|---|---|---|---|---|---|---|---|---|---|
| Bit Position | 0 1 2 | $D_0$ | $D_1$ | $D_2$ | $D_3$ | $D_4$ | $D_5$ | $D_6$ | $D_7$ |
| Data Block Format: | | | | | | | | | |
| $D_0D_1D_2D_3/D_4D_5D_6D_7$ | 01 | $D_0$ | $D_1$ | $D_2$ | $D_3$ | $D_4$ | $D_5$ | $D_6$ | $D_7$ |
| Control Block Formats: | | Block Type Field | | | | | | | |
| $C_0C_1C_2C_3/C_4C_5C_6C_7$ | 10 | 0x1e | $C_0$ | $C_1$ | $C_2$ | $C_3$ | $C_4$ | $C_5$ | $C_6$ | $C_7$ |
| $C_0C_1C_2C_3/O_4D_5D_6D_7$ | 10 | 0x2d | $C_0$ | $C_1$ | $C_2$ | $C_3$ | $O_4$ | $D_5$ | $D_6$ | $D_7$ |
| $C_0C_1C_2C_3/S_4D_5D_6D_7$ | 10 | 0x33 | $C_0$ | $C_1$ | $C_2$ | $C_3$ | $S_4$ | $D_5$ | $D_6$ | $D_7$ |
| $O_0D_1D_2D_3/S_4D_5D_6D_7$ | 10 | 0x66 | $D_1$ | $D_2$ | $D_3$ | $O_0$ | | $D_5$ | $D_6$ | $D_7$ |
| $O_0D_1D_2D_3/O_4D_5D_6D_7$ | 10 | 0x55 | $D_1$ | $D_2$ | $D_3$ | $O_0$ | $O_4$ | $D_5$ | $D_6$ | $D_7$ |
| $S_0D_1D_2D_3/D_4D_5D_6D_7$ | 10 | 0x78 | $D_1$ | $D_2$ | $D_3$ | $D_4$ | | $D_5$ | $D_6$ | $D_7$ |
| $O_0D_1D_2D_3/C_4C_5C_6C_7$ | 10 | 0x4b | $D_1$ | $D_2$ | $D_3$ | $O_0$ | $C_4$ | $C_5$ | $C_6$ | $C_7$ |
| $T_0C_1C_2C_3/C_4C_5C_6C_7$ | 10 | 0x87 | | $C_1$ | $C_2$ | $C_3$ | $C_4$ | $C_5$ | $C_6$ | $C_7$ |
| $D_0T_1C_2C_3/C_4C_5C_6C_7$ | 10 | 0x99 | $D_0$ | | $C_2$ | $C_3$ | $C_4$ | $C_5$ | $C_6$ | $C_7$ |
| $D_0D_1T_2C_3/C_4C_5C_6C_7$ | 10 | 0xaa | $D_0$ | $D_1$ | | $C_3$ | $C_4$ | $C_5$ | $C_6$ | $C_7$ |
| $D_0D_1D_2T_3/C_4C_5C_6C_7$ | 10 | 0xb4 | $D_0$ | $D_1$ | $D_2$ | | $C_4$ | $C_5$ | $C_6$ | $C_7$ |
| $D_0D_1D_2D_3/T_4C_5C_6C_7$ | 10 | 0xcc | $D_0$ | $D_1$ | $D_2$ | $D_3$ | | $C_5$ | $C_6$ | $C_7$ |
| $D_0D_1D_2D_3/D_4T_5C_6C_7$ | 10 | 0xd2 | $D_0$ | $D_1$ | $D_2$ | $D_3$ | $D_4$ | | $C_6$ | $C_7$ |
| $D_0D_1D_2D_3/D_4D_5T_6C_7$ | 10 | 0xe1 | $D_0$ | $D_1$ | $D_2$ | $D_3$ | $D_4$ | $D_5$ | | $C_7$ |
| $D_0D_1D_2D_3/D_4D_5D_6T_7$ | 10 | 0xff | $D_0$ | $D_1$ | $D_2$ | $D_3$ | $D_4$ | $D_5$ | $D_6$ | |

LOW OVERHEAD CODING WITH ARBITRARY CONTROL CODE PLACEMENT

CROSS-REFERENCE TO RELATED APPLICATIONS

This application is a Continuation of U.S. Ser. No. 10/601,235, filed Jun. 20, 2003, which application claims the benefit of U.S. Provisional Application No. 60/445,767, filed on Feb. 7, 2003, and U.S. Provisional Application No. 60/449,322, filed on Feb. 21, 2003, all of which are hereby incorporated by reference in their entirety.

FIELD OF THE INVENTION

The present invention relates to networks, and more particularly to data coding in physical coding sublayers of physical layer devices in Ethernet network devices.

BACKGROUND OF THE INVENTION

Ethernet network devices include physical layer devices that transmit and receive data over a medium. In a Gigabit (Gb) network device, the physical layer device includes a Physical Coding Sublayer (PCS), which acts as an interface between a Gigabit Media Independent Interface (GMII) or extended GMII (XGMII) and a Physical Medium Attachment (PMA) layer.

The PCS typically includes an encoder/decoder. The PCS may also include other components such as a scrambler and a gearbox in certain circumstances. The gearbox is not necessary when an analog circuit in the PMA can be designed to run in multiples of a reference clock or multiples of bus widths, both of which are not easy to implement. In essence, the gearbox is a digital solution that is used to overcome analog circuit limitations. The encoder provides data formatting and organizes the data into data blocks (such as bytes) and control codes. The scrambler performs line balancing and ensures sufficient transition density. The function of the gearbox is application specific. The gearbox may include a buffer that is used to adjust for input/output speed differences and/or to format data width for a Serializer/Deserializer (SERDES).

In one approach, the PCS is implemented based on the 10GBASE-R standard in IEEE section 802.3, which is hereby incorporated by reference. The 10GBASE-R standard implements 64/66 bit encoding, which has low overhead. The 10GBASE-R standard restricts the placement of control codes within a data block during block encoding. When multiple independent communications channels are aggregated to provide high-speed link, control codes may need to appear in any byte position of a data block after the channels are combined. Therefore, the 10GBASE-R standard may pose problems for aggregated communications channels.

SUMMARY OF THE INVENTION

In some embodiments, a physical layer device of an Ethernet network device includes a reconciliation device that includes a first interface that outputs data. A physical coding sublayer (PCS) device includes an encoder that encodes the multiplexed data block to produce an encoded data block that includes n data blocks. Each of the n data blocks includes at least one of data portions, pointer portions, and control code portions. The control code portions can be located within any of the n data blocks.

In other features, a multiplexer aggregates data, which includes at least one of data portions and control portions, from m data streams received from the reconciliation device into a multiplexed data block. The first interface is XGMII compliant.

In other features, the n data blocks in the encoded data block include one of: one of the data portions, one of the pointer portions and a first half of one of the data portions, one of the pointer portions and one of the control code portions, and a second half of one of the data portions and one of the control code portions.

In still other features, the pointer portions include at least one bit that indicates whether additional control codes are present in the encoded data block. A scrambler scrambles the encoded data block to produce a scrambled data block. A sync adder adds a sync header to the encoded data block. The sync header has a first state when the encoded data block only includes data blocks. The sync header has a second state when the encoded data block includes at least one control code portion.

In still other features, when data portions occur before a last one of the control code portions in the encoded data block, these data portions are shifted relative to a block boundary in the encoded data block. When data portions occur after a last one of the control code portions in the encoded data block, these data portions are aligned with block boundaries in the encoded data block.

In some embodiments, a physical layer device of an Ethernet network device includes a serializer/deserializer that has an input and an output that outputs an encoded data block. A physical coding sublayer (PCS) device communicates with the output and includes a decoder that decodes the encoded data block. The encoded data block includes n data blocks each including data portions, pointer portions, and control code portions. The control code portions can be located within any of the n data blocks.

In other features, the decoder reads the pointer portion in one of the n data blocks. If the pointer portion of the one of the n data blocks points to the one of the n data blocks, the decoder reads the control code portion from the one of the n data blocks. If the pointer portion of the one of the n data blocks points to another of the n data blocks, the decoder reads a data portion overlapping the one of the n data blocks and an adjacent one of the n data blocks. If the pointer portion of the one of the n data blocks indicates that there are no additional control portions in the n data blocks, the decoder reads data portions from remaining ones of the n data blocks.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses. For purposes of clarity, the same reference numbers will be used in the drawings to identify similar elements. As used herein, the term device refers to an application specific integrated circuit, an electronic circuit, a processor (shared, dedicated, or group) and memory that execute one or more software programs, a combinational logic circuit, or other suitable components that provide the described functionality.

Figure 1:
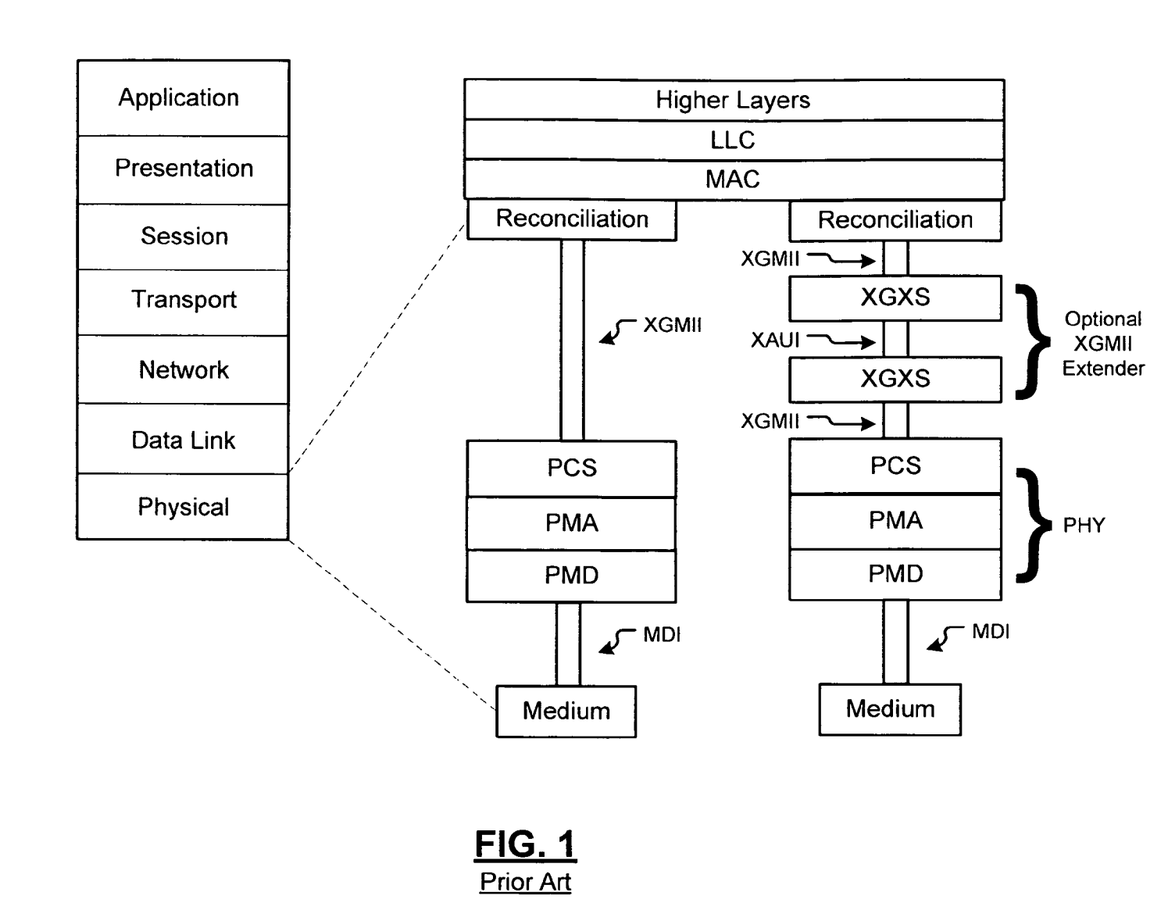
FIG. 1 illustrates the OSI Model and sublayers in a physical layer device according to the prior art.

Referring to FIG. 1, the OSI Reference Model 10 defines a network device with a physical layer device 12 that transmits and receives data to/from a medium. The physical layer device 12 is further divided into a group of sublayer devices 14. FIG. 1 illustrates the group of sublayer devices 14 for Ten Gigabit Ethernet applications. The group of sublayer devices 14 includes a Ten Gigabit Ethernet reconciliation sublayer 16, a XGMII 18, a PCS 20, a PMA 22, a Physical Medium Dependant (PMD) sublayer 24, and a Medium Dependant Interface (MDI) 26. The medium is identified at 28. The PCS 20 encodes/decodes data to/from the XGMII 18 and transfers encoded data to/from the PMA 22.

Figure 2:
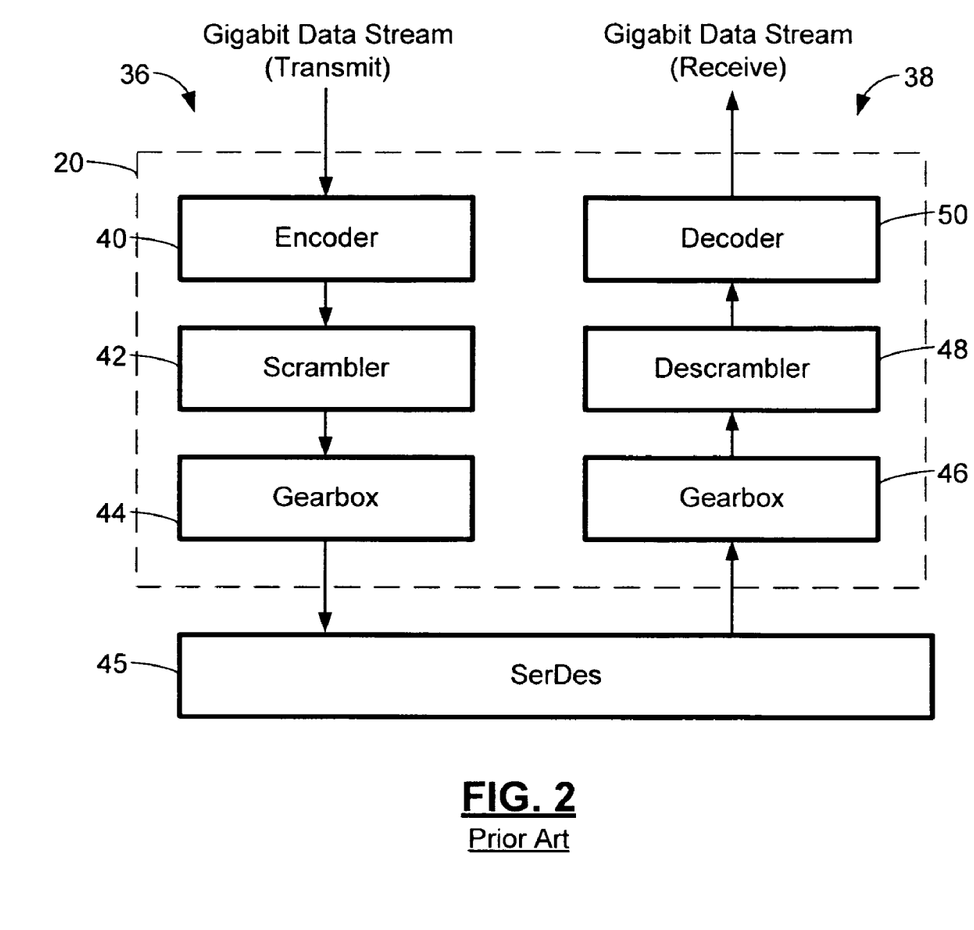
FIG. 2 is a functional block diagram of the transmitter and receiver of the PCS according to the prior art.

Referring now to FIG. 2, the PCS 20 includes a transmitter 36 and a receiver 38. The transmitter 36 includes an encoder 40, which assembles data blocks that include data bytes and/or control codes for transmission. The control codes include identification of the start and/or end of a packet and/or other data. The data blocks are transmitted from the encoder 40 to a scrambler 42. The scrambler 42 prepares the data blocks for transmission and ensures sufficient transition density. Data from the scrambler 42 is transmitted to a gearbox 44. The gearbox 44 formats data for a particular SERDES 45. The gearbox 44 may include a FIFO buffer, which is used to convert from one speed to another and/or to modify the width of a bit pattern. The receiver includes a gearbox 46, a descrambler 48, and a decoder 50, which implement the reverse of the transmit process.

For each data block transmitted, it is desirable to allow for 256 combinations of data and a limited number of control codes. For example, in 1000BASE-X 8 bit to 10 bit encoding, there are 256 possible data combinations and 12 possible control code combinations. Since there are 256+12=268 total combinations, 9 bits of data are required to encode all valid data blocks. The overhead is high because an additional bit is used to generate only 12 more combinations. When 8 bit to 10 bit encoding is implemented, 10 bits are used instead of 9, which produces an even larger overhead. However, 10 bits are used in 1000BASE-X to preserve DC balance and to ensure that sufficient transitions exist through redundant bits.

A 64/66 bit block coding concept is implemented by IEEE 802.3 in the 10GBASE-R PCS. 10GBASE-R reduces overhead and achieves DC balance through scrambling and guaranteed periodic transitions with a sync header. The additional coding complexity on the digital side increases latency in the system. Since the circuit can be run at a lower rate, power is saved.

Figure 3:
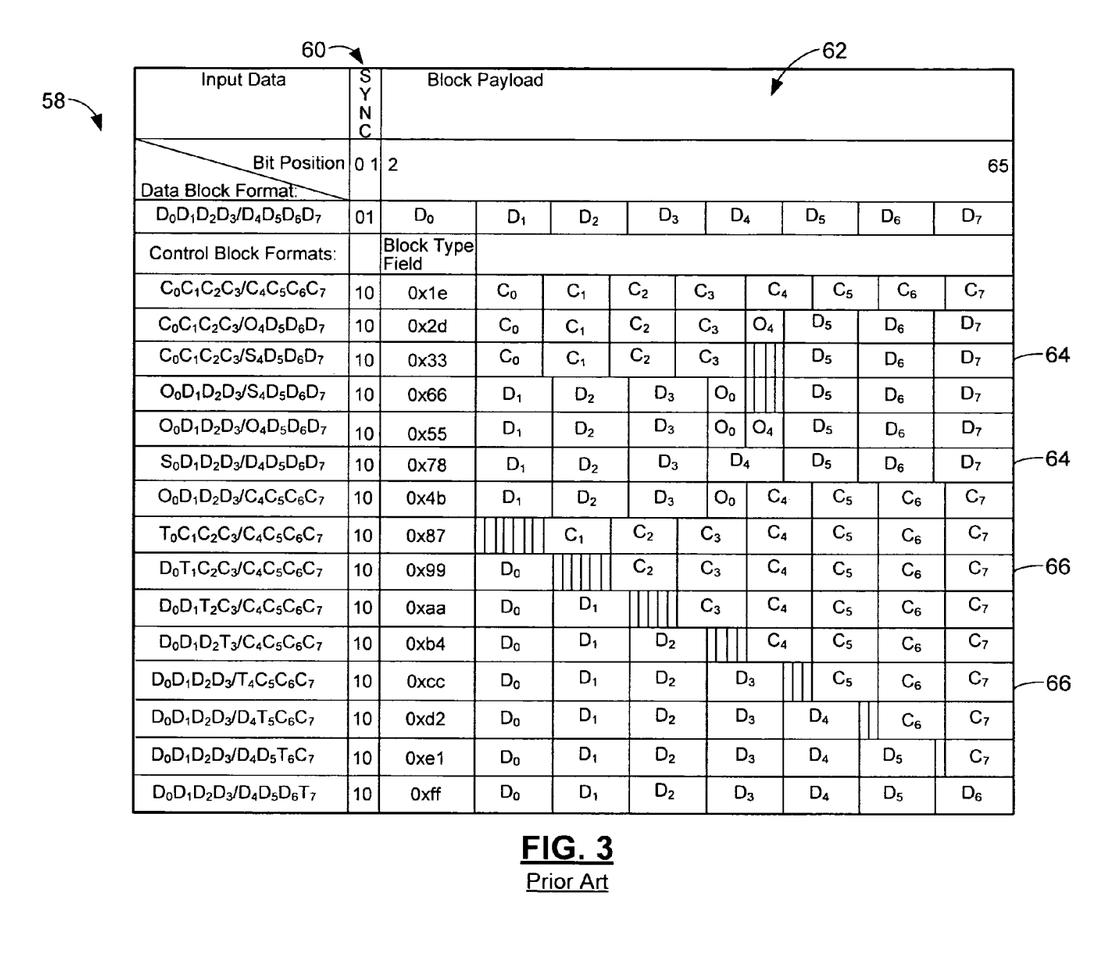
FIG. 3 illustrates the combinations of control codes and data bytes within a data block using 64/66 bit encoding according to the prior art.

Referring now to FIG. 3, a block encoding scheme 58 for 10GBASE-R is shown. The block encoding scheme 58 is set forth in IEEE 802.3, which is hereby incorporated by reference in its entirety. A 2-bit sync header 60 is followed by a 64-bit block of data 62. Each 64-bit block of data 62 includes 8 bytes that may be data bytes 64 and/or control codes 66. Bytes labeled with a C, O, S, or T represent control codes 66. Bytes labeled with a D represent data bytes 64. A 2-bit sync header 60 with a value of 01 indicates that the entire 64-bit block of data 62 is made up of data bytes 64. When the 2-bit sync header 60 has a value of 10, at least one of the control codes 66 exists among the 64-bit block of data 62.

FIG. 3 shows that there are a limited number of permutations for the control codes 66 and data bytes 64. Many combinations are not possible. For example, the combination $C_0$, $D_1$, $C_2$, $C_3$, $D_4$, $C_5$, $D_6$, $C_7$ is not possible. This limitation creates a problem when control codes 66 need to be placed within any byte in a 64-bit block of data 62. For example, when multiple independent data streams are aggregated into a high-speed link, control codes 66 need to appear in any location of a 64-bit block of data 62. Aggregation is very useful in reducing the pin count of devices. Therefore, the 10GBASE-R PCS cannot be used as currently designed when multiple independent data streams need to be aggregated.

Figure 4:
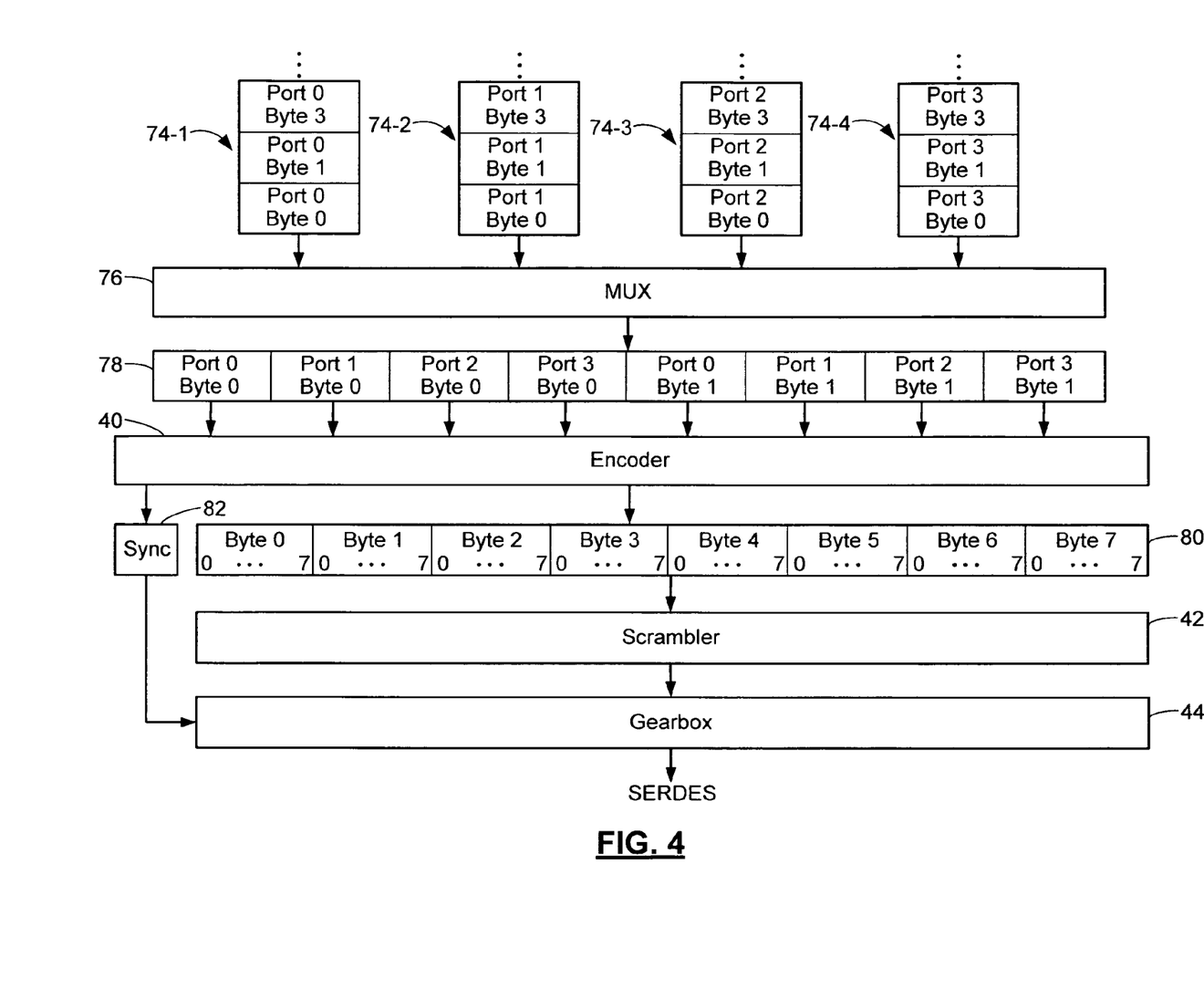
FIG. 4 is a functional block diagram of data processing within the PCS according to the present invention.

Referring now to FIG. 4, a transmitter 36 for a PCS device 20 according to the present invention is illustrated. Four independent data streams 74-1, 74-2, 74-3, and 74-4 are combined by a multiplexer 76 into an 8-byte data block 78. The encoder 40 outputs an encoded data block 80 as well as a 2 bit sync header 82. The encoded data block 80 is transmitted to the scrambler 42. The 2-bit sync header 82 is used by a receiver to lock onto a data block. The sync header 82 bypasses the scrambler 42. Both a scrambled data block and the 2-bit sync header 82 are input to the gearbox 44. Data from the gearbox 44 is transmitted to a SERDES 45. The scrambler 42 and the gearbox 44 operate according to the 10GBASE-R standard. However, the coding scheme implemented by the encoder 40 is different than the coding performed in 10GBASE-R.

Figure 5A:
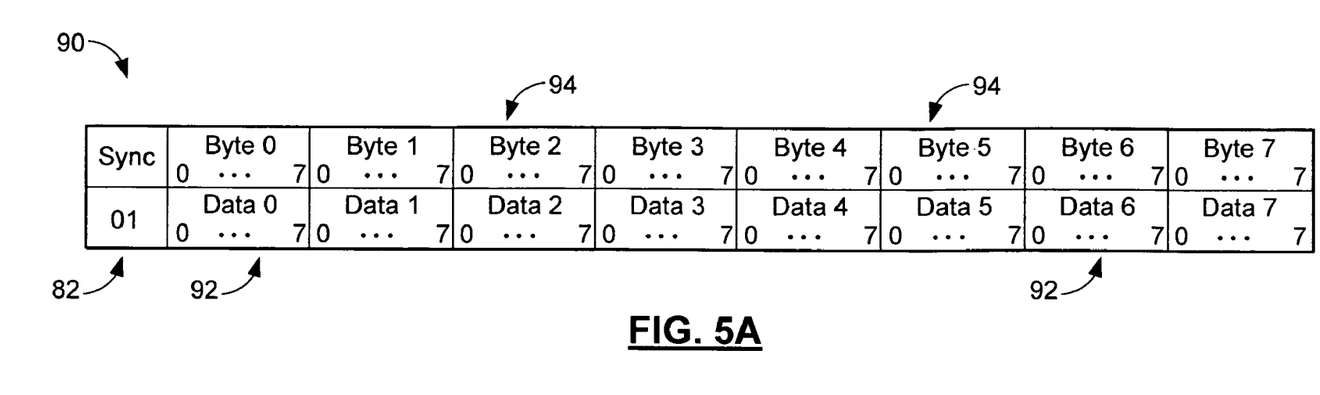
FIG. 5A illustrates an exemplary 64/66 bit encoded data block without control codes according to the present invention.

Referring now to FIGS. 5A-5E, the coding according to the present invention includes 256 data combinations and 16 control code combinations. Therefore, 8 bits are used to represent a data byte and 4 bits are used to represent a control code. FIG. 5A shows a data block 90 including all data bytes 92 and no control codes. The sync header is 01, which indicates that there are no control codes in the data block 90. The format of the data block 90 in FIG. 5A is similar to 10GBASE-R. In FIGS. 5A-5E, byte boundaries 94 are numbered 0-7. The bits are ordered with the least significant bit first.

Figure 5B:
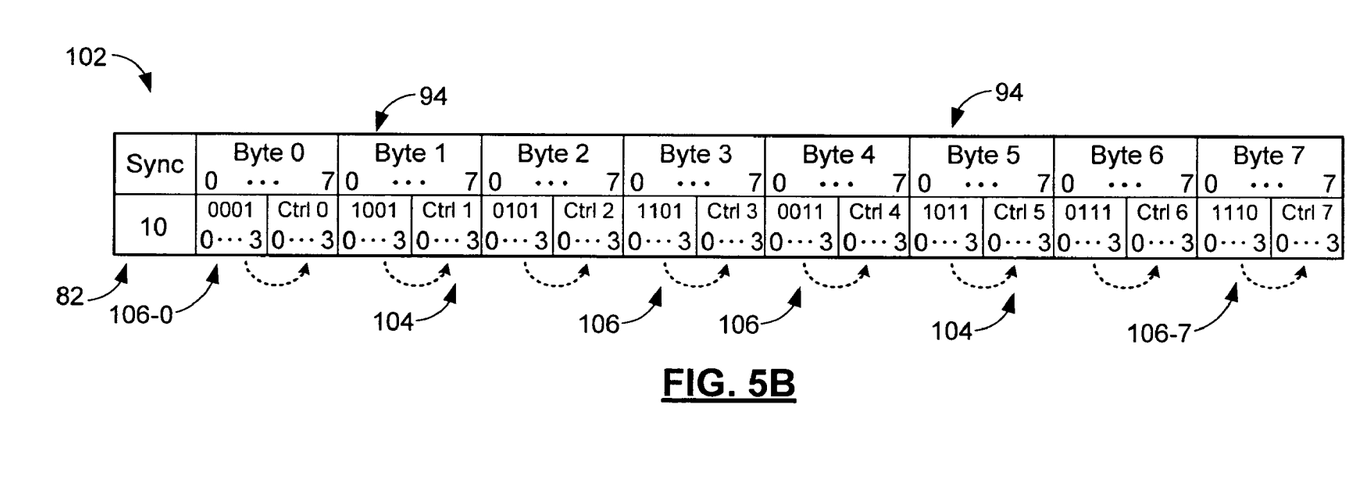
FIG. 5B illustrates an exemplary data block including all control codes.

FIG. 5B shows a data block 102 including control codes 104 in all 8 bytes of the data block 102. The sync header 82 has a value of 10 because there is at least one control code 104 among the 8 bytes of the data block 102. A control code 104 for a particular byte is located in bits 4-7. The control codes 104 have a corresponding pointer 106 that points to the location of the control code 104. A pointer 106 for a control code 104 is located in bits 0-3 of a particular byte. Whenever the sync header is 10, bits 0-3 of the first byte is a pointer 106. In FIG. 5B, the first pointer 106-0 is located in bits 0-3 of byte 0. Bits 0-2 of a pointer 106 indicate the location of the next control code 104 in the data block 102. Bit 3 of a pointer 106 indicates whether there are additional control codes 104 following the particular control code that the pointer 106 points to.

Bits 2:0 of a pointer 106 take on a value from 0 to 7 that corresponds to the byte boundary 94 number where the control code 104 is located. For example, bits 2:0 of the pointer 106-0 in byte 0 are 000 indicating the control code 104 is located in byte 0. Bits 2:0 of the pointer 106-1 in byte 1 are 001 indicating the next control code 104 is located in byte 1. Bit 3 of the pointer 106-0 in byte 0 is 1, which indicates that there is another control code 104 following the control code that the pointer 106 points to. Bit 3 of the pointer 106-7 in byte 7 is 0, which indicates that there are no more control codes 104 after the control code the pointer 106 points to. Bit 3 of a pointer 106-7 in byte 7 should be 0 since it is the last byte of the data block 102.

Figure 5C:
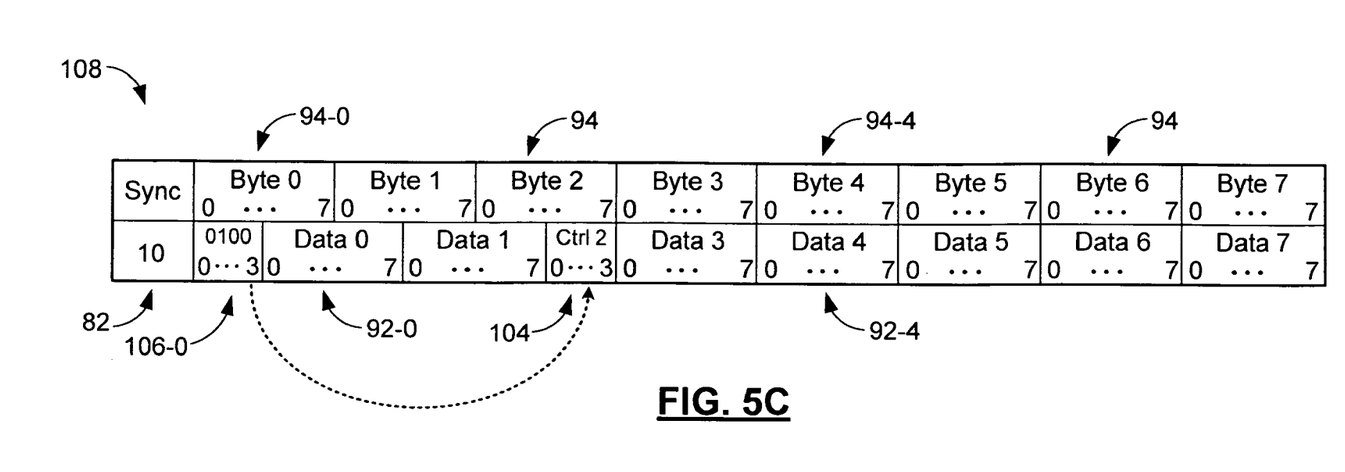
FIG. 5C illustrates an exemplary data block including data bytes prior to the last control code shifted one nibble to the right with respect to the byte boundaries.

FIG. 5C shows a data block 108 that includes a pointer 106 and a control code 104 in different byte boundaries 94. Bits 2:0 of the pointer 106-0 in byte 0 are 010, which indicates that the next control code is located in byte 2. Bit 3 of the pointer 106-0 in byte 0 is 0, which indicates that the next control code is the final control code in the data block 108. In FIGS. 5A-5E, the data bytes 92 that occur before the final control code are shifted 4 bits (1 nibble) to the right. Data bytes 92 that occur after the final control code are aligned with the byte boundaries 94. For example, data byte 0 (92-0) in FIG. 5C occurs before the final control code. The first 4 bits of data byte 0 (92-0) are located in byte boundary 0 (94-0) and the last 4 bits of data byte 0 (92-0) are located in byte boundary 1 (94-1). Data byte 4 (92-4) occurs after the last control code and is located completely within byte boundary 4 (94-4).

Figure 5D:
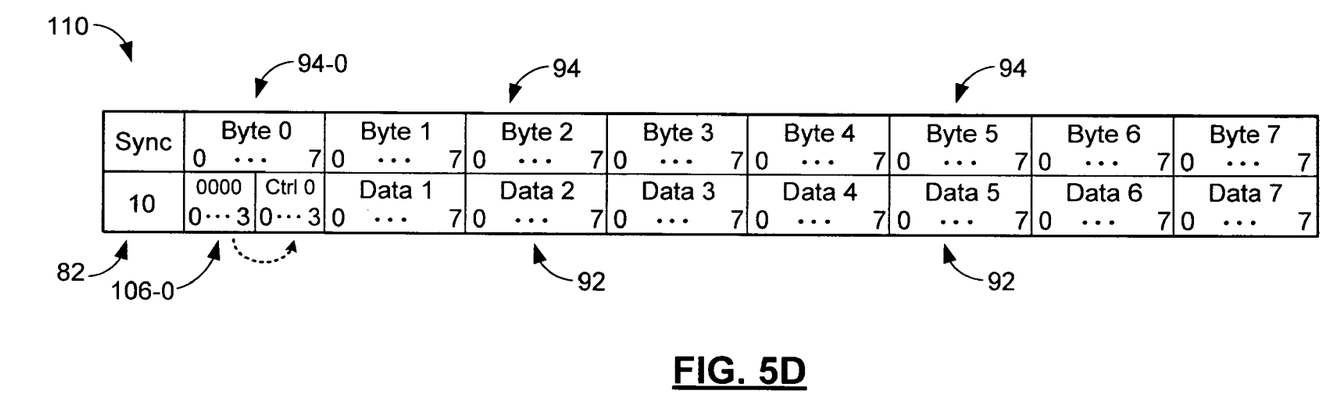
FIG. 5D illustrates an exemplary data block including data bytes following the last control code aligned with the byte boundaries.

FIG. 5D shows a data block 110 with all of the data bytes 92 located within the byte boundaries 94. This is because the only control code occurs in byte boundary 0 (94-0). Bits 2:0 of the pointer 106-0 in byte boundary 0 are 000, which indicates that the next control code is located in byte boundary 0 (94-0). Bit 3 of the pointer 106-0 in byte boundary 0 (94-0) is 0, which indicates that the next control code is the last control code of the data block 110.

Figure 5E:
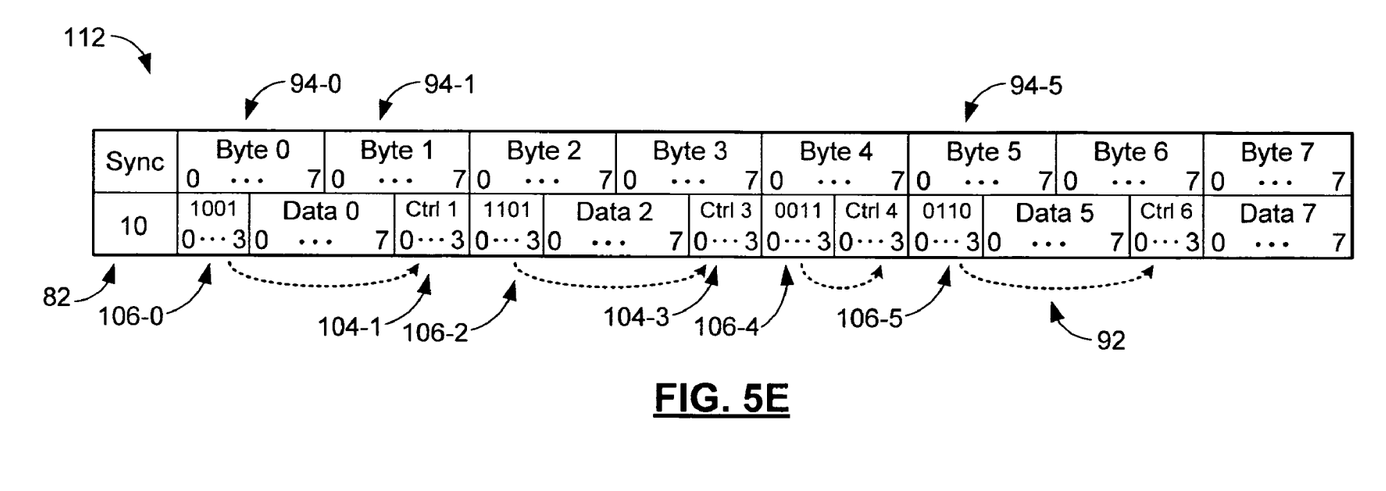
FIG. 5E illustrates an exemplary data block including control codes and data bytes.

FIG. 5E shows a data block 112 with multiple control codes 104 and data bytes 92. Bits 2:0 of the pointer 106-0 in byte boundary 0 (94-0) are 001, which indicates that the next control code is located in byte boundary 1 (94-1). Bit 3 of the pointer 106-0 in byte boundary 0 is 1, which indicates that the next control code is not the last control code of the data block 112. A pointer 106 is always located after a control code that is not the last control code of the data block 112. For example, the pointer 106-2 in byte boundary 2 follows the control code 104-1 in byte boundary 1, and the pointer 106-4 in byte boundary 4 follows the control code 104-3 in byte boundary 3. The pointers 106 are always located in bits 0-3 of a byte boundary 94.

Bits 2:0 of the pointers 106 indicate an absolute byte boundary 94 value and do not indicate an offset. Therefore, the pointers 106 can only point in one direction, and it is possible for bits 2:0 of a pointer 106 to contain an invalid value. For example, bits 2:0 of a pointer 106-5 in byte boundary 5 (94-5) cannot have a value of 010 since byte boundary 5 (94-5) follows byte boundary 2 (94-2). Therefore, a value for bits 2:0 for a pointer 106-5 in byte boundary 5 that is less than 5 is invalid.

The data blocks of the present invention are preferably a series of link lists. This implementation minimizes the required hardware. In the IEEE standard, data bytes and control codes can appear in a variety of locations within a data block. In the present invention, there are only 2 possible locations for a data byte within a byte boundary. Data bytes that are located before the last control code are shifted one nibble to the right, and data bytes that are located after the last control code are aligned with the byte boundaries. Therefore, only a 2 to 1 multiplexer is required for the hardware to detect where a data byte is located within a byte boundary. The bit positioning simplifies the required digital logic. The present invention is an improvement in the encoding phase of the PCS to allow for arbitrary control code placement, while still using 64/66 bit coding.

Figure 6:
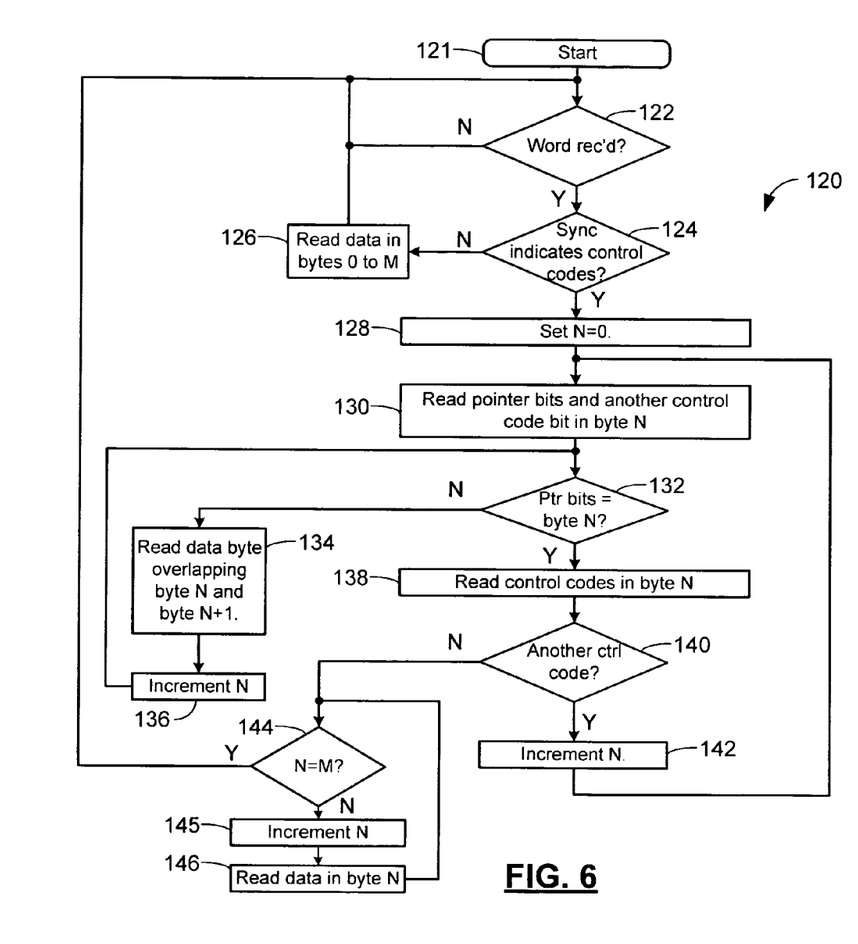
FIG. 6 illustrates decoding steps.

Referring now to FIG. 6, a decoding algorithm 120 according to the present invention is shown. The bytes of a word are numbered 0 to M. Control begins in step 121. The decoder 50 determines whether a word was received in step 122. If false, control returns to step 122. If true, the decoder 50 determines whether the sync header indicates that the word contains control codes in step 124. If false, control proceeds to step 126. In step 126, the decoder 50 reads data in bytes 0 to M of the input word and control returns to step 122. If the sync header indicates that the word contains control codes in step 124, control proceeds to step 128. In step 128, N is set equal to 0.

In step 130, the decoder 50 reads the pointer in byte N. The pointer bits indicate the location of the next control code and whether there is another control code. In step 132, the decoder 50 determines whether the pointer bits correspond to byte N. If false, control proceeds to step 134. In step 134, the decoder 50 reads a data byte that overlaps byte N and byte N+1. In step 136, N is incremented, and control returns to step 132.

If the pointer bits point to byte N in step 132, control proceeds to step 138. In step 138, the decoder 50 reads the control code in byte N. In step 140, the decoder 50 determines whether the pointer bits identify another control code in the word. If true, control proceeds to step 142 where N is incremented and then control returns to step 130. If there are no additional control codes in step 140, the decoder 50 determines whether N is equal to M in step 144. If false, control proceeds to step 145 and increments N. In step 146, the decoder 50 reads data in byte N, and control returns to step 144. If N is equal to M in step 144, control returns to step 122.

An exemplary embodiment of decoding equations according to the present invention is found below. The variable RX_SYNC refers to a data block sync header. A value of 01 for RX_SYNC indicates that the data block contains all data bytes. A value of 10 for RX_SYNC indicates that the data block contains at least one control code. A value of 00 or 11 for RX_SYNC is invalid.

The variable RX_BYTEn [7:0] refers to a 64-bit block of data in the data block. The variable n in RX_BYTEn [7:0] can take on a value from 0 to 7. For example, RX_BYTEn [0] refers to the first bit after the block sync header.

The variable RX_CTRL [7:0] refers to decoded control code bits, and corresponds to the variable RX_DATAn. A value of 1 indicates a byte with a control code, and a value of 0 indicates a data byte. The variable RX_DATAn [7:0] refers to a decoded 64-bit block of data. The variable n in RX_DATAn [7:0] takes on a value from 0 to 7. For example, RX_DATAn [0] is the earliest arriving decoded bit. When RX_CTRL [n] is 0, RX_DATAn [7:0] contains a data byte. When RX_CTRL [n] is 1, RX_DATAn [3:0] contains a control code, and RX_DATAn [7:4] is unknown and ignored.

For the function definition [(condition) ? true_value:false value], if condition is true, then true_value is loaded. Otherwise, false_value is loaded. In the following equations, a • ("dot" symbol) refers to a logical AND operation. A + (plus symbol) refers to a logical OR function except when it is used as a variable index. For example, the "+" in (x+1) refers to an addition function. A Σ "summation symbol" refers to logical OR function of all of the products.

As a constant definition, RX_BYTE8 [3:0]=0000.
RX_CTRL[0]=(RX_SYNC=10)•(RX_BYTE0[2:0]=0).
Recursively, RX_CTRL [n], for n=1 to 7, $$RX\_CTRL[n] = (RX\_SYNC = 10) \cdot \left( (RX\_BYTE0[2:0] = n) + \sum_{x=0}^{n-1} RX\_CTRL[x] \cdot RX\_BYTEx[3] \cdot (RX\_BYTE(x+1)[2:0] = n) \right).$$

$$RX\_DATAn[7:0] = \left( \sum_{x=n}^{7} RX\_CTRL[x] \right) ? \{RX\_BYTE(n+1)[3:0], RX\_BYTEn[7:4]\} : RX\_BYTEn[7:0].$$

An exemplary embodiment of encoding equations according to the present invention is found below. The variable TX_SYNC refers to a data block sync header. A value of 01 for TX_SYNC indicates that the data block contains all data bytes. A value of 10 for TX_SYNC indicates that the data block contains at least one control code. A value of 00 or 11 for TX_SYNC is invalid.

The variable TX_BYTEn [7:0] refers to a 64-bit block of data in the data block. The variable n in TX_BYTEn [7:0] can take on a value from 0 to 7. For example, TX_BYTEn [0] refers to the first bit after the block sync header.

The variable TX_CTRL [7:0] refers to unencoded control code bits, and corresponds to the variable TX_DATAn. A value of 1 indicates a byte with a control code, and a value of 0 indicates a data byte. The variable TX_DATAn [7:0] refers to an unencoded 64-bit block of data. The variable n in TX_DATAn [7:0] takes on a value from 0 to 7. For example, TX_DATAn [0] is the earliest arriving decoded bit. When TX_CTRL [n] is 0, TX_DATAn [7:0] contains a data byte. When TX_CTRL [n] is 1, TX_DATAn [3:0] contains a control code, and TX_DATAn [7:4] is unknown and ignored.

The function LOWEST (binary_value) returns the lowest bit position that has a value of 1. The possible values are from 0 to 7. The variable binary_value is an eight bit value. If all eight bits are 0, then a 0 is returned. For example, if binary_value=00111010, a value of 1 would be returned.

As a constant definition, TX_DATA (−1) [7:4] is defined to be xxxx. The constant is called in the equation, but the "if" condition does not call for the value. TX_CTRL [−1] is defined to be 1. TX_CTRL [8] is defined to be 0. Ln[2:0]=LOWEST(TX_CTRL[7:0] & (11111111<<0)), where & is a bit-wise AND function, and << is a left shift of n bits with a padding of 0.

$$TX\_SYNC = \left( \sum_{x=0}^{7} TX\_CTRL[x] \right) ? 10:01.$$

$$TX\_BYTEn[3:0] = \left[ \left( \sum_{x=n+1}^{8} TX\_CTRL[x] \right), \right.$$

$$Ln[2:0] \right] \text{if } TX\_CTRL[n-1] \cdot \left( \sum_{x=n}^{7} TX\_CTRL[x] \right)$$

$$TX\_DATA(n-1)[7:4] \text{if } !TX\_CTRL[n-1] \cdot \left( \sum_{x=n}^{7} TX\_CTRL[x] \right)$$

$$TX\_DATAn[3:0] \text{if } !\left( \sum_{x=n}^{7} TX\_CTRL[x] \right).$$

$$TX\_BYTEn[7:4] = TX\_DATAn[3:0] \text{if } TX\_CTRL[n]$$

$$TX\_DATAn[3:0] \text{if } !TX\_CTRL[n] \cdot \left( \sum_{x=n}^{8} TX\_CTRL[x] \right)$$

$$TX\_DATAn[7:4] \text{if } !\left( \sum_{x=n}^{7} TX\_CTRL[x] \right).$$

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification, and the following claims.

What is claimed is:

1. A physical layer device of a network device, the physical layer device comprising:
    an encoder that encodes data to produce an encoded data block;
    a scrambler that scrambles said encoded data block to produce a scrambled data block; and
    a sync adder that adds a sync header to said scrambled data block, wherein said sync header has a first state when said scrambled data block only includes data portions, and wherein said sync header has a second state when said scrambled data block includes at least one control code portion,
    wherein said encoded data block comprises n portions each including at least one of data portions, pointer portions, and control code portions,
    wherein n is an integer greater than one, and
    wherein said pointer portions indicate whether additional control code portions are present in said encoded data block.

2. The physical layer device of claim 1 further comprising a reconciliation device that includes a first interface that outputs said data to said encoder.

3. The physical layer device of claim 1 wherein said encoder locates control code portions within said n portions.

4. The physical layer device of claim 1 further comprising a multiplexer that aggregates data, which includes at least one of data portions and control portions, from m data streams received from said reconciliation device into a multiplexed data block.

5. The physical layer device of claim 2 wherein said first interface is XGMII compliant.

6. The physical layer device of claim 1 further comprising a serializer/deserializer (SERDES) that communicates with said scrambler.

7. The physical layer device of claim 5 wherein said encoder implements 64/66 bit encoding.

8. The physical layer device of claim 1 wherein when one of said data portions occurs before a last one of said control code portions in said encoded data block, said one of said data portions is shifted relative to a block boundary in said encoded data block and wherein when one of said data portions occurs after a last one of said control code portions in said encoded data block, said one of said data portions is aligned with a block boundary in said encoded data block.

9. The physical layer device of claim 1 further comprising:
a serializer/deserializer (SERDES) that communicates with said scrambler and that receives a first scrambled data block from said scrambler;
a descrambler that communicates with said SERDES that descrambles a second scrambled data block and that outputs a second encoded data block; and
a decoder that communicates with said descrambler and that decodes said second encoded data block.

10. A physical layer device of a network device, the physical layer device comprising:
an encoder that encodes data to produce an encoded data block;
a scrambler that scrambles said encoded data block to produce a scrambled data block; and
a sync adder that adds a sync header to said scrambled data block, wherein said sync header has a first state when said scrambled data block only includes data portions, and wherein said sync header has a second state when said scrambled data block includes at least one control code portion,
wherein said encoded data block comprises n portions each including at least one of data portions, pointer portions, and control code portions,
wherein n is an integer greater than one, and
wherein said n portions include one of:
one of said data portions;
one of said pointer portions and a first half of one of said data portions;
one of said pointer portions and one of said control code portions; and
a second half of one of said data portions and one of said control code portions.

11. A physical layer device comprising:
encoding means for encoding data to produce an encoded data block;
scrambling means for scrambling said encoded data block to produce a scrambled data block; and
sync adding means for adding a sync header to said scrambled data block, wherein said sync header has a first state when said scrambled data block only includes data portions, and wherein said sync header has a second state when said scrambled data block includes at least one control code portion,
wherein said encoded data block comprises n portions each including at least one of data portions, pointer portions, and control code portions,
wherein n is an integer greater than one, and
wherein said n portions include one of:
one of said data portions;
one of said pointer portions and a first half of one of said data portions;
one of said pointer portions and one of said control code portions; and
a second half of one of said data portions and one of said control code portions.

12. A physical layer device comprising:
encoding means for encoding data to produce an encoded data block;
scrambling means for scrambling said encoded data block to produce a scrambled data block; and
sync adding means for adding a sync header to said scrambled data block, wherein said sync header has a first state when said scrambled data block only includes data portions, and wherein said sync header has a second state when said scrambled data block includes at least one control code portion,
wherein said encoded data block comprises n portions each including at least one of data portions, pointer portions, and control code portions,
wherein n is an integer greater than one, and
wherein said pointer portions indicate whether additional control code portions are present in said encoded data block.

13. The physical layer device of claim 12 further comprising a reconciliation device that includes first interface means for outputting said data to said encoding means.

14. The physical layer device of claim 12 wherein said encoding means locates control code portions within said n portions.

15. The physical layer device of claim 13 further comprising multiplexing means for aggregating data, which includes at least one of data portions and control portions, from m data streams received from said reconciliation device into a multiplexed data block.

16. The physical layer device of claim 13 wherein said first interface means is XGMII compliant.

17. The physical layer device of claim 12 further comprising serializer/deserializer (SERDES) means for serializing and deserializing and for communicating with said scrambling means.

18. The physical layer device of claim 16 wherein said encoding means implements 64/66 bit encoding.

19. The physical layer device of claim 12 wherein when one of said data portions occurs before a last one of said control code portions in said encoded data block, said one of said data portions is shifted relative to a block boundary in said encoded data block and wherein when one of said data portions occurs after a last one of said control code portions in said encoded data block, said one of said data portions is aligned with a block boundary in said encoded data block.

20. The physical layer device of claim 12 further comprising:
serializer/deserializer (SERDES) means for serializing and deserializing, for communicating with said scrambling means and for receiving a first scrambled data block from said scrambling means;
descrambling means for communicating with said SERDES means, for descrambling a second scrambled data block and for outputting a second encoded data block; and
decoding means for communicating with said descrambling means and for decoding said second encoded data block.

21. A method of operating a physical layer device of a network device, the method comprising:
providing an encoder that encodes data to produce an encoded data block;
scrambling said encoded data block to produce a scrambled data block;
adding a sync header to said scrambled data block;

setting said sync header to a first state when said scrambled data block only includes data portions; and setting said sync header to a second state when said scrambled data block includes at least one control code portion, wherein said encoded data block comprises n portions each including at least one of data portions, pointer portions, and control code portions, wherein n is an integer greater than one, and wherein said n portions include one of:
- one of said data portions;
- one of said pointer portions and a first half of one of said data portions;
- one of said pointer portions and one of said control code portions; and
- a second half of one of said data portions and one of said control code portions.

22. A method of operating a physical layer device of a network device, the method comprising:

providing an encoder that encodes data to produce an encoded data block;

scrambling said encoded data block to produce a scrambled data block;

adding a sync header to said scrambled data block;

setting said sync header to a first state when said scrambled data block only includes data portions; and setting said sync header to a second state when said scrambled data block includes at least one control code portion, wherein said encoded data block comprises n portions each including at least one of data portions, pointer portions, and control code portions, wherein n is an integer greater than one, and wherein said pointer portions indicate whether additional control code portions are present in said encoded data block.

23. The method of claim 22 further comprising providing a reconciliation device that includes a first interface that outputs said data to said encoder.

24. The method of claim 22 further comprising encoding control code portions within said n portions.

25. The method of claim 23 further comprising aggregating data, which includes at least one of data portions and control portions, from m data streams received from said reconciliation device into a multiplexed data block.

26. The method of claim 23 wherein said first interface is XGMII compliant.

27. The method of claim 26 wherein said encoder implements 64/66 bit encoding.

28. The method of claim 22 wherein when one of said data portions occurs before a last one of said control code portions in said encoded data block, said one of said data portions is shifted relative to a block boundary in said encoded data block and wherein when one of said data portions occurs after a last one of said control code portions in said encoded data block, said one of said data portions is aligned with a block boundary in said encoded data block.

* * * * *